US011155360B2

(12) United States Patent
Prost et al.

(10) Patent No.: US 11,155,360 B2
(45) Date of Patent: Oct. 26, 2021

(54) METHOD FOR MONITORING AIRCRAFT ENGINES

(71) Applicant: SAFRAN AIRCRAFT ENGINES, Paris (FR)

(72) Inventors: François Prost, Moissy-Cramayel (FR); William Bense, Moissy-Cramayel (FR); Serge Blanchard, Moissy-Cramayel (FR)

(73) Assignee: SAFRAN AIRCRAFT ENGINES, Paris (FR)

( * ) Notice: Subject to any disclaimer, the term of this patent is extended or adjusted under 35 U.S.C. 154(b) by 0 days.

(21) Appl. No.: 16/489,307

(22) PCT Filed: Mar. 15, 2018

(86) PCT No.: PCT/FR2018/050621
§ 371 (c)(1),
(2) Date: Aug. 27, 2019

(87) PCT Pub. No.: WO2018/172666
PCT Pub. Date: Sep. 27, 2018

(65) Prior Publication Data
US 2019/0382128 A1    Dec. 19, 2019

(30) Foreign Application Priority Data

Mar. 20, 2017    (FR) ...................................... 1752263

(51) Int. Cl.
*B64D 45/00*    (2006.01)
*G01M 15/12*    (2006.01)
(Continued)

(52) U.S. Cl.
CPC ............. *B64D 45/00* (2013.01); *G01M 15/12* (2013.01); *G01N 29/24* (2013.01); *G06F 11/3089* (2013.01); *B64D 2045/0085* (2013.01)

(58) Field of Classification Search
CPC .......... B64D 45/00; B64D 2045/0085; G01M 15/12; G01N 29/24; G06F 11/3089;
(Continued)

(56) References Cited

U.S. PATENT DOCUMENTS 6,092,008 A * 7/2000 Bateman ................ G07C 5/008
244/1 R
6,385,513 B1 * 5/2002 Murray .............. H04B 7/18508
340/945

(Continued)

FOREIGN PATENT DOCUMENTS

DE    10 2010 017938 A1    10/2011

OTHER PUBLICATIONS

International Search Report dated Jun. 8, 2018, issued in corresponding International Application No. PCT/FR2018/050621, filed Mar. 15, 2018, 4 pages.

*Primary Examiner* — Orlando Bousono
(74) *Attorney, Agent, or Firm* — Christensen O'Connor Johnson Kindness PLLC

(57) ABSTRACT

A method for monitoring at least one engine of an aircraft wherein the aircraft includes a passenger cabin. The method includes a step of acquiring a signal that is at least in part representative of the activity of the engine, using a sensor during a flight of the aircraft, and searching for a defect in the engine by a processing unit using data obtained from the signal. In some embodiments, the sensor is in a mobile device located in the passenger cabin. In some embodiments, the health of the at least one engine uses the signal acquired by a plurality of mobile devices.

11 Claims, 2 Drawing Sheets

(51) Int. Cl.
*G01N 29/24* (2006.01)
*G06F 11/30* (2006.01)

(58) Field of Classification Search
CPC ............ B60D 2045/0085; G07C 5/008; H04N 7/181; H04W 84/005; H04L 67/12
See application file for complete search history.

(56) References Cited

U.S. PATENT DOCUMENTS

| | | | |
|---|---|---|---|
| 9,310,222 B1 | 4/2016 | Suiter et al. | |
| 2003/0032426 A1* | 2/2003 | Gilbert | H04W 84/02 455/427 |
| 2003/0093187 A1* | 5/2003 | Walker | B64D 45/0059 701/1 |
| 2004/0008253 A1* | 1/2004 | Monroe | G08B 13/19641 348/143 |
| 2005/0017876 A1* | 1/2005 | Ziarno | B64D 29/00 340/945 |
| 2005/0187677 A1* | 8/2005 | Walker | G08B 13/1965 701/16 |
| 2005/0258942 A1* | 11/2005 | Manasseh | G07C 5/008 340/425.5 |
| 2005/0275563 A1* | 12/2005 | Ziarno | B64D 45/00 340/945 |
| 2009/0012691 A1* | 1/2009 | Ziarno | H04B 7/18506 701/99 |
| 2009/0231162 A1* | 9/2009 | Ziarno | H04B 7/18506 340/945 |
| 2010/0167716 A1* | 7/2010 | Howarter | H04M 1/72577 455/419 |
| 2010/0279626 A1* | 11/2010 | Bradley | H04W 48/04 455/69 |
| 2010/0279627 A1* | 11/2010 | Bradley | H04W 48/04 455/69 |
| 2014/0114549 A1* | 4/2014 | Ziarno | G01M 15/14 701/100 |
| 2014/0306826 A1* | 10/2014 | Ricci | G06Q 10/02 340/573.1 |
| 2014/0309805 A1* | 10/2014 | Ricci | B60R 25/25 701/1 |
| 2014/0309847 A1* | 10/2014 | Ricci | A61B 5/6808 701/33.1 |
| 2014/0309852 A1* | 10/2014 | Ricci | G06Q 10/02 701/34.4 |
| 2014/0309853 A1* | 10/2014 | Ricci | B60R 25/1004 701/34.4 |
| 2016/0048399 A1* | 2/2016 | Shaw | G01D 1/18 718/1 |
| 2016/0163133 A1* | 6/2016 | Ricci | G06K 9/00268 701/33.4 |
| 2017/0259942 A1* | 9/2017 | Ziarno | G07C 5/008 |
| 2018/0205658 A1* | 7/2018 | Sullivan | H04L 67/12 |

* cited by examiner

METHOD FOR MONITORING AIRCRAFT ENGINES

TECHNICAL FIELD OF THE INVENTION

The invention relates to the field of monitoring and of maintaining aircraft with engines, such as planes.

TECHNOLOGICAL BACKGROUND

It is known from the prior art to provide monitoring sensors in or on the engines of aircraft, in order to detect any anomaly during the flight of the aircraft, and to carry out in this case a maintenance operation in order to correct this anomaly once the aircraft is on the ground. The application published under number FR3011936 discloses for example that these sensors can be placed under the nacelle of the engine.

The disadvantages of such an arrangement are in particular the cost, the bulkiness, the maintenance and the weight of the sensors and of the interfaces required for the operation of the signals obtained by these sensors.

The invention aims to overcome these disadvantages.

DISCLOSURE OF THE INVENTION

To do this, the invention relates to a method for monitoring at least one engine of an aircraft, with the aircraft comprising a passenger cabin, with the method comprising the following steps:

a step of acquiring a signal that is at least in part representative of the activity of said at least one engine by a sensor, during a flight of the aircraft, and a step of determining the health of said at least one engine by a processing unit using data obtained from the signal, characterised in that the sensor is in a mobile device located in the passenger cabin during the step of acquiring the signal, and in that the determination of the health of the at least one engine uses the signal acquired by a plurality of mobile devices.

Thus, the method for monitoring according to the invention uses the sensors already present in the mobile devices of the passengers in the cabin and thus avoids the overcost linked to the adding of new sensors on or in the engine for the implementation of the monitoring thereof. The signal acquired by the sensors is representative of the physical parameters in the cabin (noises in the case where the sensor is a microphone, vibration and/or acceleration in the case where the sensor is an accelerometer) from which it is possible to deduce the vibratory and/or acoustic activity of the engine. Using a plurality of mobile devices improves the effectiveness of the method, in particular by allowing a better location of any anomaly.

The mobile device is for example a mobile telephone, in particular a smartphone, a tablet, a portable computer, etc., capable of executing computer programs, for example in the form of applications. These mobile devices often comprise by default at least one microphone, an accelerometer and means for communicating with an outside device and/or a communication network (for example Wi-Fi or telephone network), and are transported by many passengers in the flights of aircraft dedicated to commercial civil aviation. These aircraft can transport tens or hundreds of passengers of whom a major portion has mobile devices, which allows processing the data of tens or hundreds of additional sensors with respect to the prior art.

In an embodiment of the method according to the invention, the signal is an acoustic signal and the sensor is a microphone. This embodiment is particularly advantageous because the microphones are present in all mobile devices.

Alternatively, the signal is a signal representative of the vibrations, and the sensor is an accelerometer. This embodiment is particularly advantageous because accelerometers are present in many mobile devices.

In an embodiment, the data is obtained using the signal by elimination of the elements of the signal that are independent of the activity of the engine, which allows simplifying the treatments carried out by the processing unit.

The method according to the invention can advantageously comprise a step of emitting data by the mobile device, by a radio channel, intended for a processing unit located on the ground. This allows a simple implementation of the method without overloading or modifying the onboard computer in the aircraft.

The emitting step can be carried out when the plane is on the ground, which facilitates the transmission of data with the ground communication networks or a certain time after the flight when the passenger has left the plane, or in general when the mobile device is reconnected with a communication network after having left said "airplane mode" wherein the communications are cut off.

According to an embodiment, the emitting step comprises the emitting of an identifier of the flight, which allows the processing unit to find the flight during which the acquisition took place and therefore the aircraft for which possible maintenance of the engines is to be carried out.

The emitting step can be carried out upon detection of the radio channel by the mobile device, which allows automating the emitting step.

The radio channel is for example a local area network, for example a Wi-Fi network.

The invention also relates to a method characterised in combination by any or all of the characteristics mentioned above or below.

LIST OF FIGURES

Other aims, features and advantages of the invention will appear upon reading the following description provided solely in a non-limiting manner and which refers to the appended figures, wherein.

DETAILED DESCRIPTION OF AN EMBODIMENT OF THE INVENTION

The following embodiments are examples. Although the description refers to one or several embodiments, this does not necessarily mean that each reference relates to the same embodiment, or that the features apply only to one single embodiment. Simple features of different embodiments can also be combined in order to provide other embodiments. In the figures, the scales and the proportions are not strictly complied with and this, for the purposes of illustration and clarity.

In the step 100, an identifier of the flight of an aircraft 1, for example a plane, is recorded in the memory of the mobile device, here a mobile telephone 50. The identifier of the flight can be entered by the user by means of the man-machine interface of the telephone 50 (for example, by means of the keyboard of the telephone), or automatically via an electronic ticket of the passenger on the telephone 50, or via a flight-following application, etc. The identifier of the flight can comprise the number and/or the schedule for the flight (departure time and/or arrival time) and/or the departing and/or destination airport. The identifier can also comprise a seat number in the cabin and/or an identifier of the passenger (surname and forename or loyalty card number, for example). The identifier can also be obtained from a server by the mobile telephone 50, for example by the intermediary of the mobile telephone network and/or the internet network. The step 100 can take place on the ground before the flight, in flight or after the flight.

Figure 1:
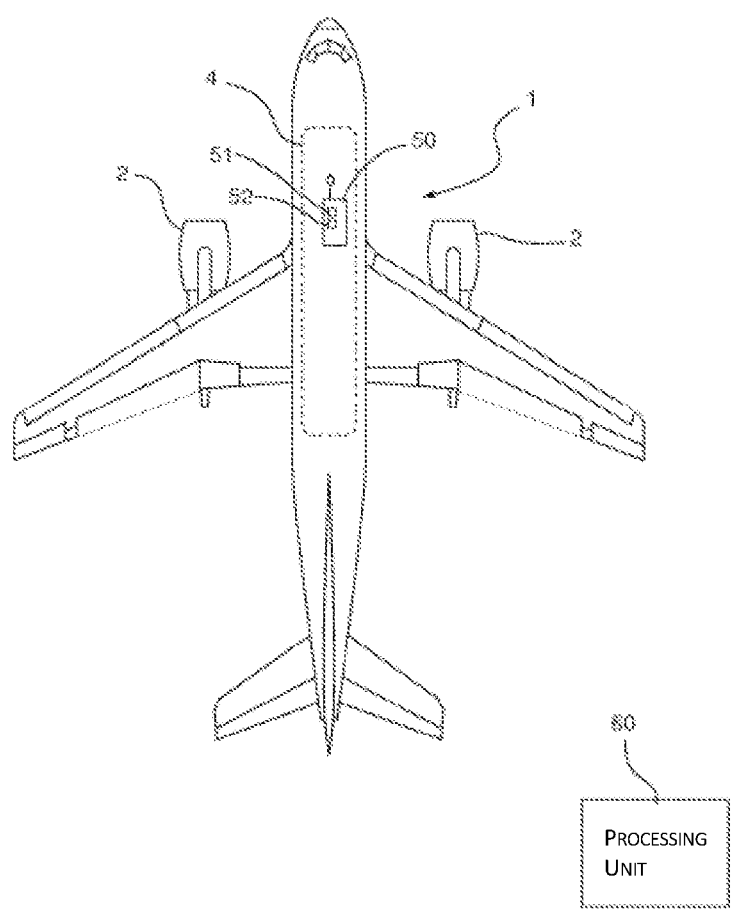
FIG. 1 shows an aircraft, a mobile device and a processing unit configured to implement a method according to an embodiment of the invention.
Figure 2:
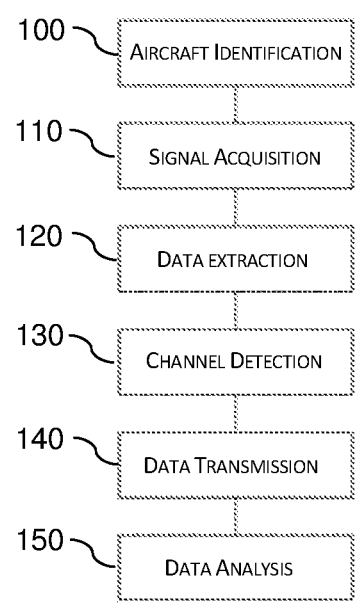
FIG. 2 shows a method according to an embodiment of the invention.

Then, in the step 110, during the flight of an aircraft 1 (and therefore during the operation of the engines 2), at least one mobile telephone 50 in the passenger cabin 4 (the contour of the passenger cabin inside the cockpit is represented as a dotted line in the FIG. 1), acquires, by means of its own sensor 52, a signal that is at least in part representative of the activity of the engines 2. The signal can be analogue or digital. The sensor 52 of the mobile telephone 50 can be a microphone. For example, it can be the microphone used to acquire the voice of the user during telephone communications. The signal is in this case of an acoustic nature. The sensor 52 can be an accelerometer. For example, it can be a sensor used to acquire the orientation of the telephone in order to orient (vertically or horizontally) the display on the screen of the telephone. The signal is for example in this case representative of vibrations. The acquisition step can be initiated and/or interrupted automatically, by the mobile telephone 50, at the time scheduled respectively by the departure time and/or arrival time of the flight, or according to predefined phases of the flight (take-off, cruising flight, landing, etc.). It can also be initiated and/or interrupted by the user (which is then also a passenger travelling in the cabin 4) by means of the man-machine interface of the mobile telephone 50. For example, the acquisition is initiated when the user switches their telephone to airplane mode (mode in which the connections to the wireless telephony and/or internet networks (3G and/or Wi-Fi) of the telephone are cut off) and/or interrupted when the user takes their telephone out of airplane mode (i.e. when the abovementioned connections are reactivated). The acquisition can also be initiated and/or interrupted upon reception by the mobile telephone 50 by a message received from the processing unit, for example by means of the mobile telephone network. The user can also enter their feelings (i.e. a text that represents their feelings) about the flight by means of the man-machine interface of the mobile telephone 50.

In the step 120, data representative of the activity of the engine is obtained using the signal by the telephone 50. When the sensor 52 is a microphone, the data is representative of the noises emitted by the engine, and is extracted from the signal by a processing aiming to eliminate the noises in the cabin that does not come from the engine (for example, the conversations of passengers, or the noise generated by the air conditioning system). The data is for example stored in the memory of the telephone 50 at least until the step 140. According to other embodiments, the extraction of the data relative to the engine of the signal is not done on the telephone but later.

The noises emitted by the engine are differentiated from the other noises of the cabin for example by bandwidth (difference between the specific engine bandwidth and specific bandwidth of the voices of the passengers for example), or by correlation between the noises received by all of the telephones/mobile devices. The same applies for the vibrations. Furthermore, the "normal" and "abnormal" noises of the engines are known and the search for these noises in the spectrum is simplified. Listening to all of the telephones/mobile devices under normal conditions also makes it possible to improve the detections of abnormal conditions and of parasitic noises (which are furthermore variable from one flight to another). The vibrations that relate to the engine are also extracted from other types of vibrations, such as the vibrations due to the rolling of the plane on the runway, movements of the gear and of the elevons, the APU, the air conditioning system, etc.

These noises/vibrations are extracted by conventional signal processing.

In the step 130, the mobile telephone 50 detects a radio channel. This can be a local area network, for example a Wi-Fi network.

In the step 140, the mobile telephone 50 emits, to the processing unit 6 which is located on the ground (not in the plane), the data and the identifier of the flight, by means of the radio channel. Prior to this emission, the mobile telephone will have, in an embodiment, digitised and compressed the signal or the data. The step 140 intervenes for example after the flight, once the plane is on the ground. The emission can be carried out by means of a Wi-Fi terminal, for example located in the airport. The emission can be triggered automatically upon locating this Wi-Fi terminal by the telephone. The emission can furthermore use the internet network for example if the processing unit 6 is not in the airport. In this case, the processing unit 6 can comprise a web server.

In an embodiment, the steps 100 to 140 can be implemented, at least partially, by a computer program 51 of the telephone 50. This can for example be an application (for example increasing the loyalty of passengers or only devoted to implementing the invention) that is loaded beforehand from a web server and installed on the mobile telephone 50. Alternatively, the steps 100 to 140 can be implemented by dedicated electronic circuits.

In the step 150, the processing unit 6 analyses the data, in order to rule on the state of health of the engines 2. The plane to which these engines belong can be identified using the flight identifier. This step must preferably use the data transmitted by several telephones 50 present in the cabin 4. If a defect is detected or suspected, a maintenance operation of the engines 2 can then be carried out.

During the step 150, a confidence index of each mobile telephone (or passengers) can be established by the processing unit 6 for example according to the duration of the acquisition of the signal, impressions of the user or their loyalty in the use of the system.

Of course, the invention is not limited to solely the embodiments described. For example:

The data can be identical to the signal, for example when in the cabin, the intensity of the noises of the engine is much higher than that of the parasitic noises, to such a point that it is not necessary to remove the elements of the signal obtained by the sensor that are independent of the noises of the engine.

The emitting step can be carried out at any time, as soon as the end of the acquisition or as the acquisition takes place, during the flight.

The processing unit can be part of the plane, in particular when the acquisition step takes place during the flight, The emitting step does not necessarily comprise the emitting of a flight identifier. In this case, the step 100 is not necessarily required. For example, in this case, the processing unit 6 can find the flight and therefore the aircraft in question, using the telephone number 50 in the mobile telephone network or another identifier of the telephone or of the passenger, by looking up the passenger in a database who is associated with this number and the flight on which the passenger is registered. The GPS coordinates can also be used or the relay antenna can also be identified, etc.

Radio channels other than a local area network or a Wi-Fi network can be considered. The radio channel can thus be a mobile telephone network. The unloading of data can also be manual.

The step 100 does not necessarily take place before the step 110. It can for example take place after the step 140 and even after the step 150.

The invention claimed is:

1. A method for monitoring at least one engine of an aircraft, with the aircraft comprising a passenger cabin, the method comprising:
   acquiring a signal that is at least in part representative of activity of said at least one engine by at least one sensor, during a flight of the aircraft, and
   determining a health of said at least one engine by a processing unit using data obtained from the signal,
   wherein the at least one sensor is positioned in one of a plurality of mobile devices located in the passenger cabin and mobile with respect to said passenger cabin which acts as a frame of reference, and wherein the determination of the health of the at least one engine uses a signal acquired by the plurality of mobile devices, and
   wherein the data is obtained by eliminating elements of the signal independent of the activity of said at least one engine.

2. The method according to claim 1, wherein the signal is an acoustic signal and the sensor is a microphone.

3. The method according to claim 1, further comprising:
   emitting data by the mobile device by a radio channel directed to a processing unit located on a ground.

4. The method according to claim 3, wherein the emitting step is performed when the aircraft is grounded.

5. The method according to claim 3, wherein the emitting step comprises emitting an identifier of the flight.

6. The method according to claim 3, wherein the emitting step is performed upon detection of the radio channel by the mobile device.

7. The method according to claim 6, wherein the radio channel is a local area network.

8. The method according to claim 1, wherein the signal is representative of vibrations and the sensor is an accelerometer.

9. The method according to claim 1, wherein the one of a plurality of mobile devices is comprised among a smartphone, a tablet and a portable computer.

10. The method according to claim 1, wherein the elimination of the elements of the signal that are independent of the activity of said at least one engine is realized by eliminating the elements of the signal that are not included in a predetermined a bandwidth corresponding to said activity of said at least one engine.

11. The method according to claim 1, wherein the elimination of the elements of the signal that are independent of the activity of said at least one engine is realized by correlation between the noises received by all of the mobile devices and elimination of the correlated noise.

* * * * *